US008395300B2

(12) United States Patent
Aabloo et al.

(10) Patent No.: US 8,395,300 B2
(45) Date of Patent: Mar. 12, 2013

(54) USES OF ELECTROACTIVE POLYMER MATERIALS

(75) Inventors: Alvo Aabloo, Tartu (EE); Maarja Kruusmaa, Tallinn (EE); Andres Punning, Tartu (EE); Paolo Fiorini, Verona (IT); Urmas Johanson, Tartu (EE)

(73) Assignee: University of Tartu, Tartu (EE)

( * ) Notice: Subject to any disclaimer, the term of this patent is extended or adjusted under 35 U.S.C. 154(b) by 791 days.

(21) Appl. No.: 12/473,694

(22) Filed: May 28, 2009

(65) Prior Publication Data

US 2009/0293664 A1  Dec. 3, 2009

Related U.S. Application Data

(63) Continuation-in-part of application No. PCT/EE2007/000024, filed on Nov. 28, 2007.

(60) Provisional application No. 60/867,417, filed on Nov. 28, 2006, provisional application No. 60/953,274, filed on Aug. 1, 2007.

(51) Int. Cl.
*H02N 2/06* (2006.01)
*H01L 41/09* (2006.01)

(52) U.S. Cl. .................. 310/328; 310/317; 310/800

(58) Field of Classification Search .................. 310/317, 310/328, 800
See application file for complete search history.

(56) References Cited

U.S. PATENT DOCUMENTS

| | | | |
|---|---|---|---|
| 7,193,350 B1 * | 3/2007 | Blackburn et al. | 310/311 |
| 7,315,106 B2 * | 1/2008 | Asaka et al. | 310/300 |
| 7,481,782 B2 * | 1/2009 | Scott et al. | 601/5 |
| 7,514,850 B2 * | 4/2009 | Asai | 310/328 |
| 2002/0175598 A1 * | 11/2002 | Heim et al. | 310/328 |
| 2004/0217671 A1 * | 11/2004 | Rosenthal et al. | 310/328 |
| 2005/0162042 A1 * | 7/2005 | Krill | 310/328 |
| 2005/0162049 A1 * | 7/2005 | Krill | 310/800 |
| 2006/0069425 A1 * | 3/2006 | Hillis et al. | 623/1.16 |
| 2006/0158065 A1 * | 7/2006 | Pelrine et al. | 310/328 |
| 2009/0085444 A1 * | 4/2009 | Alvarez Icaza Rivera et al. | 310/365 |

FOREIGN PATENT DOCUMENTS

WO  WO-2011050820 A2 * 5/2011
WO  WO-2011163530 A1 * 12/2011

* cited by examiner

*Primary Examiner* — Thomas Dougherty
(74) *Attorney, Agent, or Firm* — Birch, Stewart, Kolasch & Birch, LLP

(57) ABSTRACT

Novel applications of electroactive polymer materials, particularly of ionic polymer metal composite (IPMC). Such applications include manipulators with combined electromechanical and electroactive actuators. Applications are particularly suitable in low gravity environment.

9 Claims, 8 Drawing Sheets

USES OF ELECTROACTIVE POLYMER MATERIALS

RELATED APPLICATIONS

This application is a continuation-in-part of PCT Application No. PCT/EE2007/000024, filed Nov. 28, 2007 which application claims the benefit of U.S. Provisional Applications No. 60/867,417 filed Nov. 28, 2006 and No. 60/953,274 filed Aug. 1, 2007 and which claims priority to Estonian Patent Application No. P200700028 filed Jun. 7, 2007. Each of these applications is herein incorporated by reference in their entirety for all purposes.

FIELD OF THE INVENTION

The invention relates to the field of applications of electroactive polymer (EAP) materials, particularly to ionic polymer metal composite (IPMC) materials or other bending EAP materials with conducting surface layers, including such applications suitable in space systems.

BACKGROUND OF THE INVENTION

The robotic applications developed and exploited until today almost exclusively use electromechanical actuators. Even though the technology of electromechanical devices is very well established and has thorough theoretical background, control methods and reliable applications demonstrated during several decades, it is reaching its limits. Such devices comprise rigid links to connect rotating joints, gears and bearings and are, therefore, unavoidably complex, rigid and noisy. At the current state, reducing the size and energy consumption of such devices is extremely challenging task.

An alternative approach is to use shape-changing materials, such as electroactive polymers (EAP), to actuate robotic devices.

Electroactive properties of ionic polymers are caused by mobility or diffusion of ions. EAP materials of this group include carbon nanotubes, conductive polymers, ionic polymer gels and ionic polymer metal composites. Ionic polymers bend when electric stimulation is applied. They produce large displacement when stimulated and operate at low voltages. Because of the dynamic processes inside the materials they do not keep the strain but relax after a while to the initial configuration. Therefore the applications of such materials are usually inspired by aquatic animals, e.g., mimicking motion of a caudal fin, pectoral fins, a mollusk or a tadpole.

FIG. 1 depicts IPMC material sheet in a bent configuration with the opposite driving voltage polarity (A and C) and an initial configuration with no electric stimulus applied (B). Ionic polymer materials are made of a highly porous ion fluorinated polymer, like Nafion®, Flemion®, Teflon® and their modifications, filled with ionic conductive liquid. During material fabrication the proton connected to the terminal group (the chemical unit in the end of a polymer chain), is replaced with a metal ionic cat-ion ($Na+$, $Li+$). These cat-ions will dissociate in water, so that terminal groups will have a negative charge and at the same time there will be an excess of free cat-ions in the material (see FIG. 2, to the left). A sheet from this kind of material is then covered with a metal coating, usually platinum or gold.

Since water molecules are dipoles, they orient themselves in electromagnetic field and get attached to the free metal cat-ions. An applied electric field causes an electric current and the cat-ions start to move to one side of the material causing expansion of the material on that side and contraction on the other side (FIG. 2, in the middle).

The bent conformation is an imbalanced situation. Water starts to diffuse in the opposite direction and the polymer sheet relaxes after some time (FIG. 2, to the right). These materials do not keep their position under direct current. At the same time, their action length is remarkable and they operate at low voltage (1.2-7V). The actuator performance of IPMCs depends on their morphology, as well as on other parameters such as membrane thickness, electrodes surface conductivity, solvent type and anion doping. These parameters can be tuned during the manufacturing process. IPMC is therefore an engineering material that can be customized to application requirements.

In addition to actuation properties, IPMC materials can also work as sensors. If the IPMC material is mechanically bent, a voltage is generated between the surface electrodes due to the non-uniform concentration of ions in the membrane. The effect is observed when the sheet is in motion, i.e., the sensor works as an accelerometer. For that reason, IPMC sensors have been investigated as vibration sensors for active noise damping.

However, the signal of the sensor is very week (1 mV-2 mV) while the actuator is at the same time driven with 2 V-4 V input signals. The equivalent circuit in FIG. 3 shows that the IPMC material is essentially an infinite lossy transmission line. Therefore, the signals, traveling back and forth along the material are considerably distorted and delayed. It is difficult to distinguish the sensor signal from the distorted and delayed driving signal.

An alternative way, described in PCT/EE2007/000005 (authors M. Kruusmaa, A. Punning, A. Aabloo), is to use the change of the surface resistance to measure the bending of the actuator. The resistance of the metal surface electrodes of the IPMC sheet (shown as Ra and Rb in FIG. 3) changes during bending and the change of the resistance is highly correlated to the bending curvature. The change of the surface resistance is not caused by the electroactive properties of the IPMC sheet (like in the case of vibration sensors) but by the properties of the metal surface electrode. The resistance of a thin metal coating increases or decreases if the metal layer is compressed or stretched out. This effect can be used to determine the position of the IPMC sheet and a design has been is proposed that permits the IPMC sheet to be used as a self-sensing actuator. The output signal of such a sensor is at least an order of magnitude stronger (10 mV-20 mV) than of the conventional vibration sensor with a very good signal to noise ratio. The sensor signal is at least an order of magnitude stronger and is not distorted by the dynamics of the transmission line. Unlike the conventional vibration sensor this self-sensing actuator gives accurate information about the configuration of the sheet also when the sheet is not in motion. Therefore it can be used as a position sensor but also as an accelerometer if the sensor data is sampled over time.

Compared to electromechanical devices, EAPs have several complimentary advantages. They are lightweight, soft and flexible, easy to miniaturize, and permit distributed actuation and sensing. The behavior of the EAP materials in electric field somewhat resembles the performance of biological muscles, therefore EAP materials are considered suitable for biomimetic devices. Although compared to electromechanical devices, EAPs have low output force or small strain (depending on the material used), high energy consumption and lack of well-established control methods, they are a promising alternative to overcome the drawbacks of bulky, noisy, rigid electromechanical devices.

Short link comprising IPMC material acts similarly to a rotational joint as described in Estonian patent application No EE200700028, filed on 7 Jun. 2007, inventors Kruusmaa et al, applicant Tartu University.

Thus, there is a need for new robotic applications with actuators, based on shape changing materials like ionic polymer metal composite materials.

SUMMARY OF THE INVENTION

The objective of the invention is to provide new applications for electroactive polymer (EAP) materials, such as ionic polymer metal composite (IPMC) materials or other bending EAP materials with conducting surface layers.

Another objective of the invention is to combine the complementary advantages of electromechanical actuators and shape-changing materials into new devices. One aspect of the invention is a bio-inspired design concept of a flexible, compliant manipulator with distributed actuation and sensing. The manipulator comprises a DC-motor driven semi-rigid plastic backbone surrounded by the layer of EAP, such as ionic conducting polymer metal composites (IPMC) artificial muscle bundles. The DC-motor driven backbone permits precise positioning of the manipulator, holds the manipulator in a steady position and guarantees sufficient output force and torque. At the same time the IPMC materials in a form of artificial skin and muscle like structures provide softness and flexibility and distributed sensing and actuation. In contact with an object this kind of manipulator is capable of sensing the object, and the distributed actuation would permit fine manipulation and grasping.

Since the IPMC materials have both sensor and actuator properties, and they currently have limited force generation capabilities (about 100 mN), the inventions are particularly useful in the microgravity environment of space. Applications according to present invention that could satisfy the above constraints include a sensing protective covering for robotic arms and astronaut suites, for active (haptic) gloves, but also transportation mechanisms, shape changing supports, and small probes for planetary rovers. The proposed systems take advantage of EAP materials of forming sheets that can deflect and form surface waves, on the application of an electric field. For example, the sensing protective covering for astronaut suites and robotic arms forms a protective cushion to prevent damages to space suites. On Earth, protective functions are carried out by airbags of various types, but in space airbag action would be too violent and may cause other damages and problems. A sheet of EAP material is capable of changing its mechanical impedance upon sensing a contact with an external object, thus providing local stiffness and localized protection from a potential impact.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4 depicts an application of actuators comprising IPMC or other bending EAP materials with conducting surface layers or other bending materials as a self-rolling wheel-like manipulator. Particularly.

FIG. 5 depicts another application of actuators comprising IPMC or other bending EAP materials with conducting surface layers where standing wave is generated within the actuator.

FIG. 6 depicts another application of actuators comprising IPMC or other bending EAP materials with conducting surface layers.

DETAILED DESCRIPTION

Figure 1:
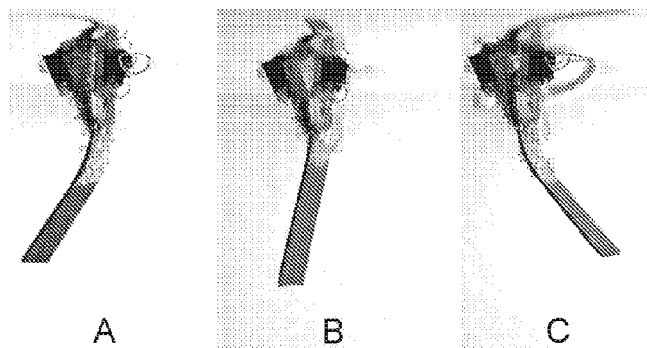
FIG. 1 depicts an ionic polymeric metal composite material sheet in a bent configuration with the opposite driving voltage polarity (A and C) and an initial configuration with no electric stimulus applied (B).
Figure 2:
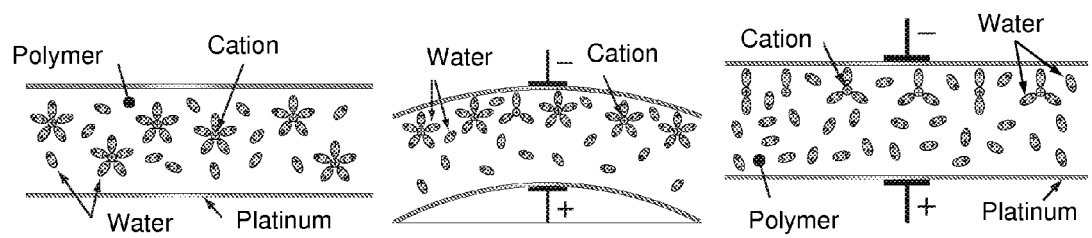
FIG. 2 depicts the ionic polymeric metal composite material sheet in the initial configuration without and electric stimulus applied (to the left), bent configuration caused by ion migration and water swelling in an electric field (in the middle) and in the relaxed state caused by water diffusion (to the right).
Figure 3:
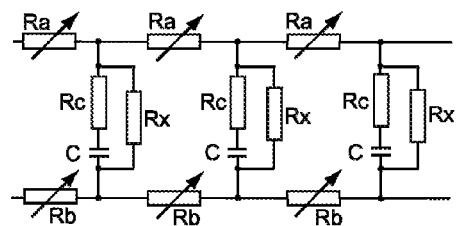
FIG. 3 depicts an improved equivalent electric circuit of an ionic polymeric metal composite material actuator.
Figure 4A:
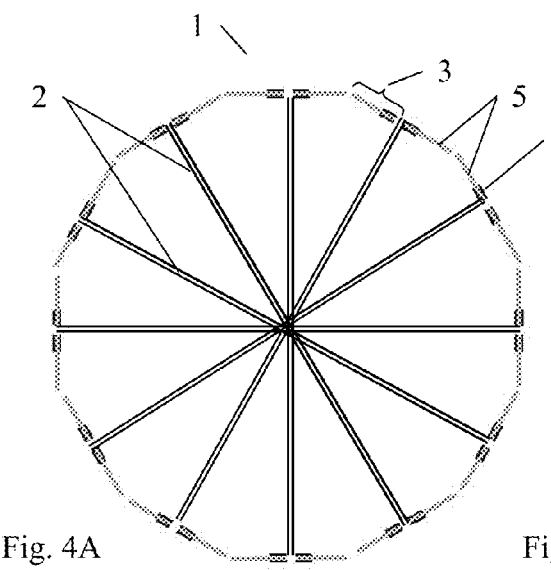
FIG. 4A is a side view of the manipulator with inactivated actuators.
Figure 4B:
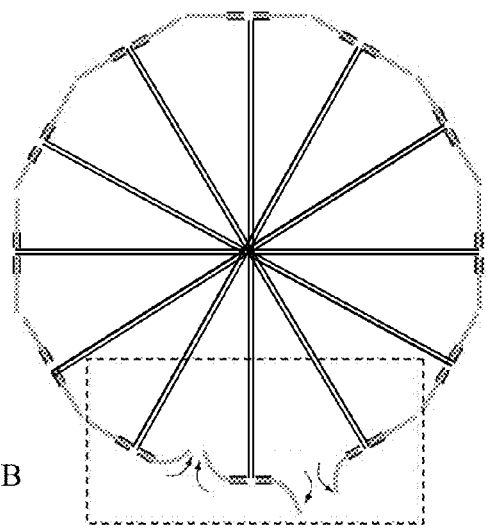
FIG. 4B is a side view of the manipulator, showing 4 activated actuators.
Figure 4C:
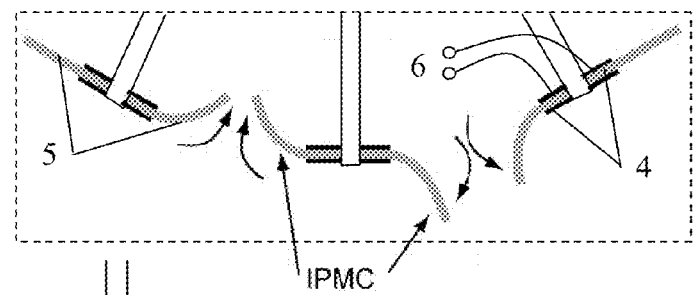
FIG. 4C is an extended view of the activated actuators shown on FIG. 4B.
Figure 4D:
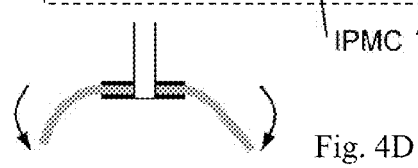
FIG. 4D shows the position of two actuators for stopping the wheel from rolling.

The invention is now illustrated by reference to the enclosed drawings. FIGS. 1 and 2 illustrate the operation of IPMC actuators. FIG. 3 represents an improved equivalent electric al model of IPMC that also takes into account the surface resistance change of the IPMC material during bending. It consists of a series of connected resistors Ra and Rb, indicating the surface electrodes along the IPMC. Between the resistors representing the two surfaces there are single-unit cells consisting of resistors Rx representing the resistance of the polymer gel layer as an electric conductor and a capacitor C in conjunction with resistor Rc representing the characteristics of the exponential step response curve of the current. This combination forms a two-dimensional linear approximate model of the IPMC.

One embodiment of the invention is a shape changing manipulator, having a plurality of elements, each of said elements at least partly made of a bending electroactive polymer (EAP) material with conducting surface layer, each of said plurality of elements connected with at least one another element of said elements; and a power source for controllably powering said elements, wherein said elements configured to assume a number of predetermined shapes for handling different objects.

This manipulator could provide very useful tool for space environment as the elements of EAP material can assume one of a number of predetermined shapes. Such a device could provide support for tools and instruments, and would also be capable of exercising some kind of grasp to the object itself.

Another embodiment of the invention is a shape changing manipulator, having a semi-rigid structure and plurality of elements, made of a bending EAP material, surrounding said semi-rigid structure so that the semi-rigid structure can be moved to provide precise positioning and required force and torque while said plurality of elements provide an additional grasp and sensing of the object.

Another embodiment is a glove-like manipulator. Such manipulator comprises first, inside layer, and second, external layer, both layers made of EAP materials. External layer operates as touch and force sensor of external deflections and internal layer acts as an actuator controlled by and reflecting the external deflections to a hand within the glove like manipulator. Such active (haptic) glove solves another problem, often mentioned by astronauts, namely the lack of touch and grasp sensitivity. EAP based materials are materials with great potential in haptic applications since EAP based materials provide distributed forces mimicking the contact with the objects.

Another embodiment is application is a manipulator that has octopus limb like structure with an internal rigid structure consisting of, possibly, cable actuated links, and an external coverage of EAP material, which would provide sensing and manipulation support to the arm. The external EAP coverage would have some independent mobility from the internal rigid structure, thus performing some shape adjustment when necessary. This configuration could also include small fingers, that would be capable of entering small spaces.

FIG. 4 depicts another embodiment of the invention, a wheel-like manipulator 1, comprising spokes 2 and a rim (i.e., surface of the wheel) that is at least partially composed of shape changing actuators 3 that are each attached to its spoke by its non-movable section 4. Each actuator has moving portion 5 that is capable of moving towards to, or away from the center of the manipulator when voltage is applied through electrodes 6. The manipulator may have a power source within (i.e., inside) the wheel, however, the power source can also be outside the wheel. In this case, the wheel must have contacts for supplying the voltage to the wheel. Also, the manipulator may have a control circuit inside. The control circuit provides the voltage from the power source to an individual actuator or a group of actuators to make the manipulator to change its shape. The actuators may be activated and correspondingly, the shape changed to make the manipulator to move in a desired manner (to roll, to bounce).

The control circuit may have a wireless communication unit so that it can be manually or computer-controlled from outside the manipulator. In another embodiment, the control circuit comprises a memory and a processor, for storing and running programs, necessary for autonomous operation of the manipulator.

Another embodiment of the invention is an elliptical (ball-like) manipulator that is generally a 3D version of the wheel-like manipulator. It has a surface that is at least partially composed of shape changing actuators that are attached to each other by non-movable sections. Each actuator has moving portion that is capable of moving towards to, or away from the center of the manipulator when voltage is applied through electrodes. The manipulator preferably has a power source and control circuit inside. The control circuit provides the voltage from the power source to an individual actuator or a group of actuators to make the manipulator to change its shape and/or to move in other desired manner.

Another embodiment of the invention is a wheel-like or a ball like manipulator, having a rim or a surface that is at least partially composed of shape changing actuators that are attached to each other; e.g., by connecting the non-movable sections of the actuators.

Self-sensing actuators as described in PCT application PCT/EE2007/000004, claiming the priority of Estonian patent application P200600005, inventors Kruusmaa et al, assigned to Tartu University (filed on 8 Mar. 2006) may be used. In this case, the manipulator is capable of "sensing" obstacles and, if programmed accordingly, passing them safely.

Figure 10:
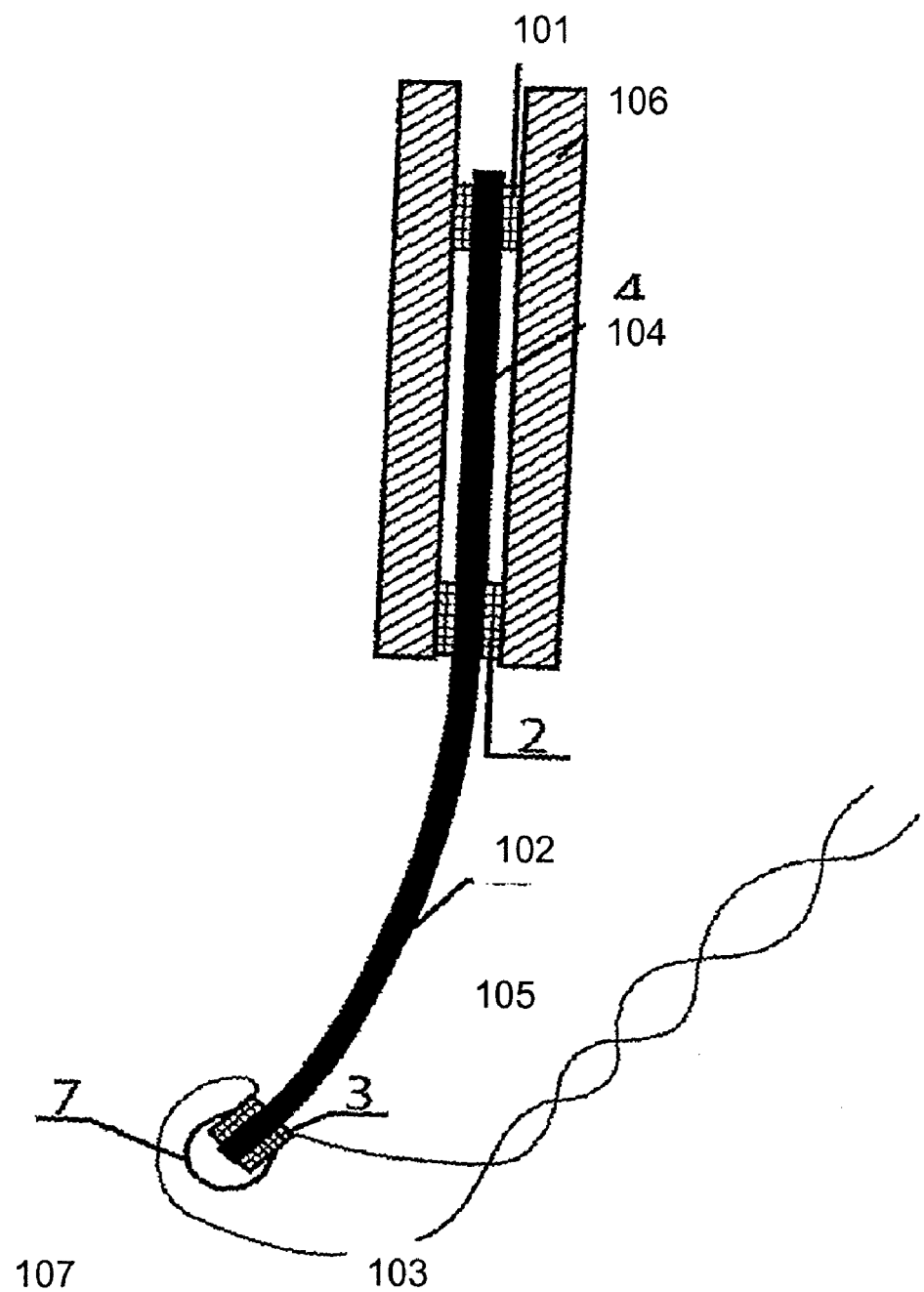
FIG. 10 is a side view of a self-sensing actuator of the background art that is suitable to be used in different embodiments of the invention.

FIG. 10 depicts a side view of a self-sensing actuator of the background art. A control signal contact pair 102 is attached to the IPMC material to control the actuator. A sensor signal contact pair 101 is located on the rigidly fixed part 104 of the actuator. Rigidity of the area 104 between contact pairs 101 and 102 is provided by a retainer 106. A part 105 of the self-sensing actuator is moveable (e.g., can bend or change its shape) and performs the functions of the actuator. A sensor signal contact pair 103 is attached to the moveable part 105 with a clamp 107.

According to another embodiment of the invention, the wheel-like manipulator (or similar 3D manipulator, a ball-like manipulator) comprises an elastic rim (or surface) and a plurality of shape-changing actuators, each actuator having a first end connected to each other in a center region of the manipulator, and each actuator extending in a different radial direction from the center region. The shape of the manipulator can be changed by applying voltage to an individual actuator or to a group of actuators. The shape of the manipulator can be changed to cause the manipulator to move (e.g., to roll or to bounce), or to allow the manipulator to fit into tight spots and/or to lift different objects.

Figure 8A:
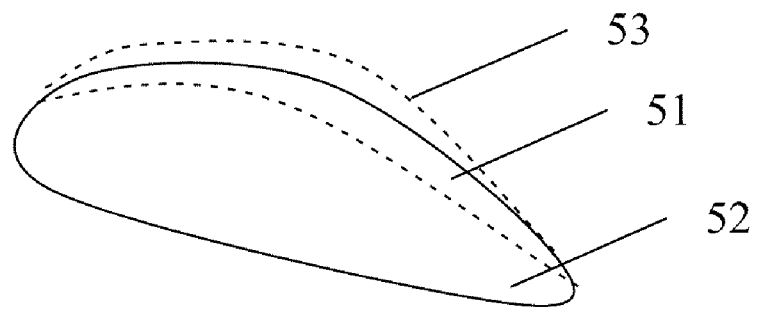
FIG. 8 depicts another application of actuators comprising IPMC or other bending EAP materials with conducting surface layers for steering a flying machine.
Figure 8B:
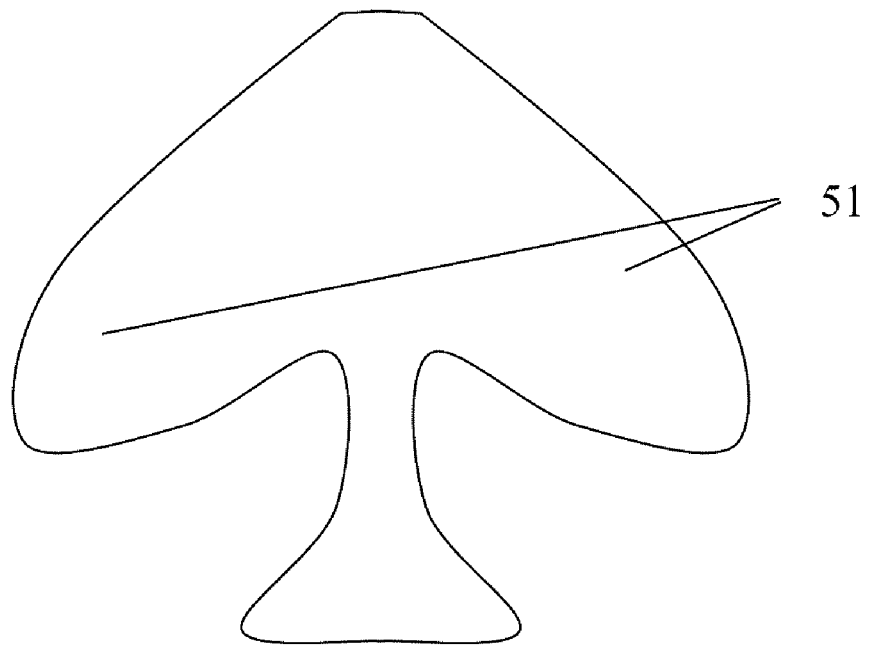

Another embodiment of the invention is a manipulator having a plurality of elements of EAP materials that form a steering surface, suitable for steering a flying device. The IPMC materials and other bending EAP materials with conducting surface layers are lightweight, stiff but flexible. Their actuation movement is commonly bending. At the same time they cannot create a lot of force, but they can be fast. Aerodynamic forces to any flying device have high value and they fluctuate force. Therefore, a small flying device which uses IPMC or other bending EAP materials with conducting surface layers actuators for steering is proposed. The IPMC or other bending EAP with conducting surface layers actuators are not used in the sense of deflating several steering surfaces like ailerons etc. The actuators are changing the curvature of surfaces (see 51, 52 and 53 in FIG. 8A) which will lead to the change of lifting power of specific surface. The flying device will have only horizontally oriented flying surfaces and no flapping and vertical surfaces (see FIG. 8).

Figure 5A:
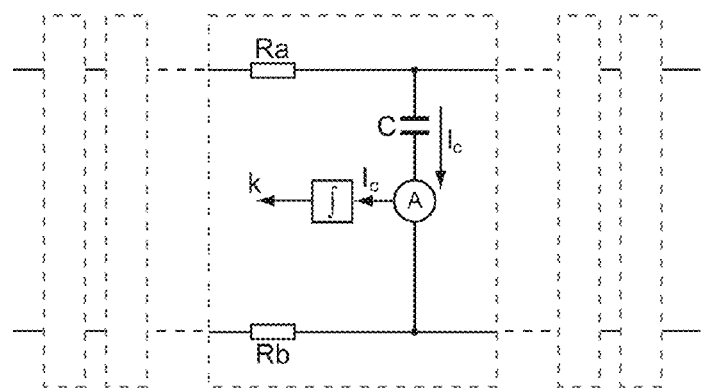
FIG. 5A is a model of the actuators comprising IPMC or other bending EAP materials with conducting surface layers as a distributed transmission line and FIG. 5B illustrates the set up of generating the standing wave within the actuator comprising IPMC or other bending EAP materials with conducting surface layers.
Figure 5B:
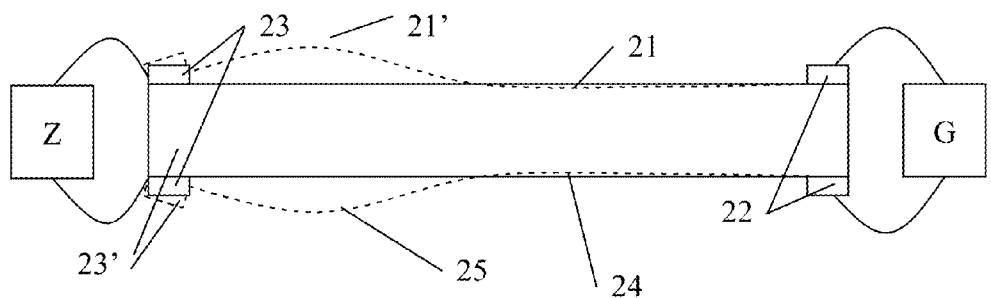

Another application of bending EAP is depicted in FIGS. 5A and 5B. The bending EAP sheet 21 (FIG. 5B) can be presented as complicated distributed transmission line, model of which is given in FIG. 5A. Each single unit of the RC transmission line contains an ammeter measuring the current $I_C$ through the capacitance C. The current $I_C$ is integrated with respect to time, resulting to the mechanical response k of the single unit.

For a specific sample of the bending EAP sheet 21, the distributed model has specific electrical parameters and has a definite length as the sample has definite size. A functional harmonic power source 22 is connected to one end of the bending EAP sheet and a terminator 23 with impedance value Z is connected to another and of the bending EAP sheet. Value of Z is chosen so that there will be stationary wave 24 inside the bending EAP sheet. The bending EAP sheet will expand near maximums 25 of stationary wave. It is possible to generate different resonances with several maximums. The stationary wave phenomena can be used for make actuator to move or expand. It can also used for transportation objects along EAP or transporting device itself.

Another embodiment of the invention is a method for transporting objects in a microgravity environment, the method comprising placing the object on a sheet of EAP material, and applying an electric field to said actuator, according to a predetermined algorithm, thereby creating a surface wave on the sheet. A transportation system can be designed that is based on the method. Such system can move objects in one or two directions and are advantageous in a microgravity environments because they are very small and very light compared to conventional conveyor belts.

Figure 7A:
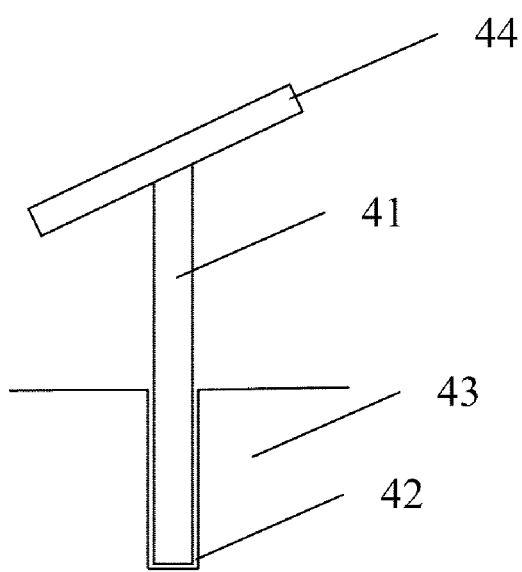
FIG. 7 depicts another application of actuators comprising IPMC or other bending EAP materials with conducting surface layers as a fast and precise surface deflector device.
Figure 7B:
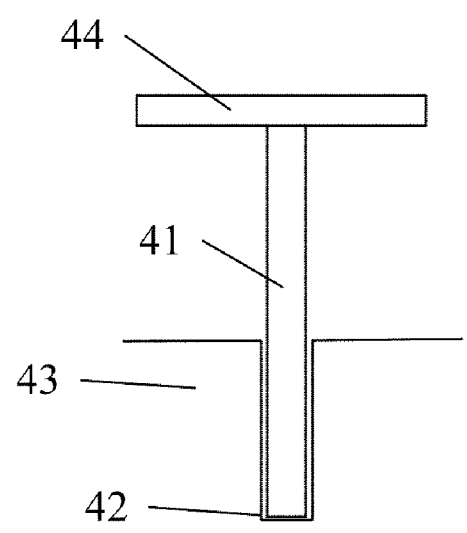

FIGS. 7A and 7B depict another application of IPMC or other bending EAP with conducting surface layers material—a fast and precise surface deflector device. An IPMC or other bending EAP with conducting surface layers sheet 41 is inserted into rift 42 in a base 43 by one end and the surface 44 is attached (e.g., glued) to other end (upper end in FIGS. 7A and 7B). The surface can be for example a small mirror. The electrical signal is applied to the left and right surfaces of the IPMC or other bending EAP with conducting surface layers sheet. While applying electrical signal IPMC or other bending EAP with conducting surface layers tries to bend, but as it is inserted into rift, it cannot bend. Due to electrostatic forces one side (right side in Figures) of the IPMC or other bending EAP with conducting surface layers sheet expands and the surface attached to upper side deflects as seen in FIG. 7B. Such fast and precise deflectors can be used to tilt mirrors and lenses in optical devices. The electrical signal is a periodic signal with frequency up to 10 kHz.

Figure 6A:
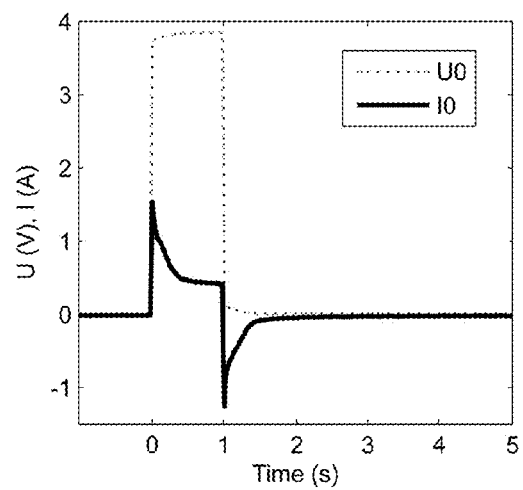
FIG. 6A shows a typical voltage and current diagram of the actuators comprising IPMC or other bending EAP materials with conducting surface layers and FIG. 6B shows a simple circuit to harvest (i.e., to collect) the reverse current impulse.
Figure 6B:
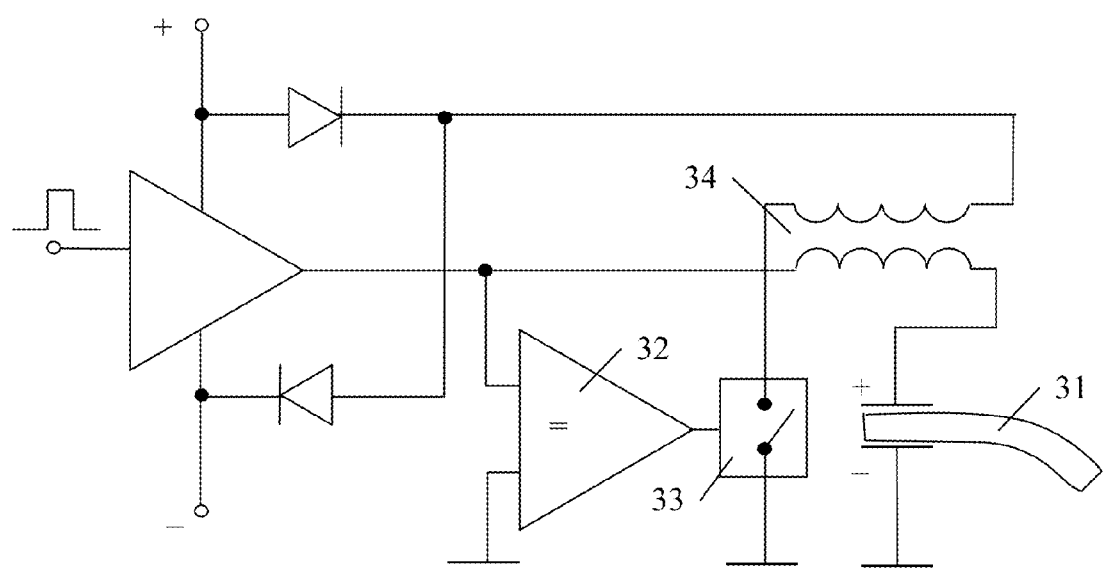

Another embodiment of the invention is an energy harvesting method. FIG. 6A shows a typical voltage and current diagram of the IPMC or other bending EAP with conducting surface layers actuator 31 (see FIG. 6B). The end of the voltage impulse triggers current impulse with reversed direction due to discharging the EAP. One aspect of the invention is to harvest (to collect) the reverse current impulse by using simple circuit shown in FIG. 6B. The harvesting will be initiated by comparator 32 controlled electrical switch 33 (relay in the simplest case). The collected current is amplified by a simple transformer 34 to ensure that the voltage of reverse impulse has the same value as it was initial voltage. The harvested energy may be used, e.g., for moving (bending) the IPMC or other bending EAP with conducting surface layers actuator 31 in opposite direction. The device enables to increase efficiency of the IPMC or other bending EAP with conducting surface layers actuator.

Figure 9:
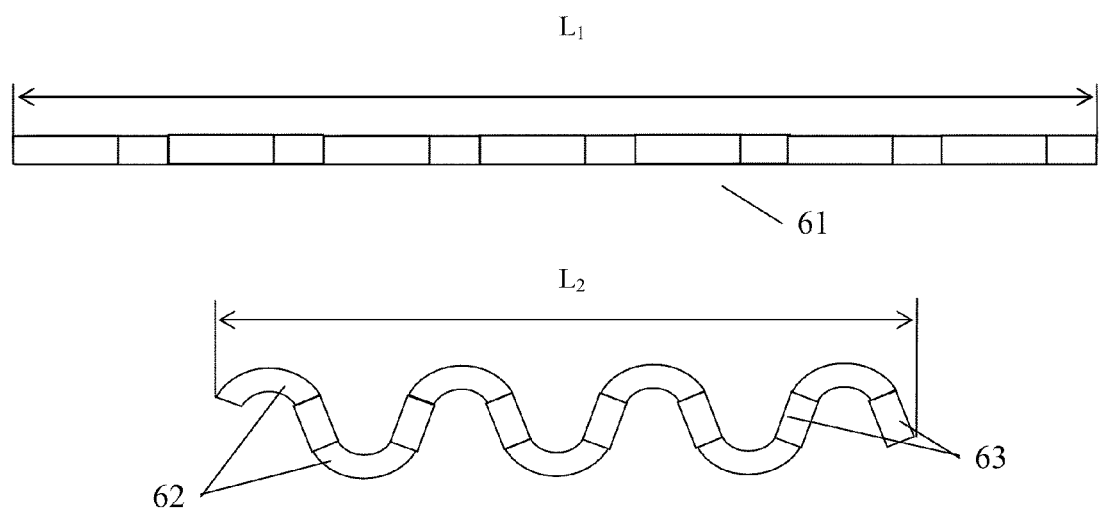
FIG. 9 depicts another application of actuators comprising IPMC or other bending EAP materials with conducting surface layers as a linear actuator.

Another embodiment is shown on FIG. 9—a linear actuator based on IPMC or other bending EAP with conducting surface layers actuators. IPMC or other bending EAP with conducting surface layers actuators bend when voltage is applied. Linear IPMC or other bending EAP with conducting surface layers actuator 61 comprises several links, comprising an active link 62 and a passive link 63. It can be shown that short IPMC or other bending EAP with conducting surface layers actuator acts as a rotational joint (described in Estonian patent application No P200700028, filed on 7 Jun. 2007, inventors Kruusmaa et al, assigned to Tartu University).

When voltage is applied to such active links, the length $L_1$ of the linear IPMC or other bending EAP with conducting surface layers actuator 61 decreases to $L_2$.

Another application of the IPMC materials is using chemical solvent stimulation to make a linear actuator from perfuorinated ionomeric membranes. The polymer matrices of IPMC commonly have some perfluorinated ionomeric membrane, e.g., ion fluorinated polymer materials, sold under trademarked names Nafion®, Flemion® and Teflon®. It is known that several solvents uptake into polymers in different amounts (see, e.g., Marc Doyle, et al, "Relationship between ionic conductivity of perfluorinated ionimeric membranes and nonaqueos solvent properties" Journal of Membrane Science (2001) 184, 257-273).

The weight uptake of solvent varies from solvent from 2% to 230%. The increase of volume increases from 0% to 90%.

The list of solvents which can be used may include: $H_2O$, NMF, MeOH, DMF, DMA, DMSO, NMP, ACE, MG, DMPU, DMB, EG, GBL, TEP, TMS, BG, DME, EC, DBA, NBA, DMDA, PC, MF, THF, PODO, DMTHF, PEG, DMC, CAN, MA, DEC, DIOX, DMES, MTBE, DMSU, DEE, EA, MEED, EAA, FC1, FC2.

The material volume increase and decrease is anisotropic, so it is possible to make linear actuator using membrane material of IPMC. Procedure of making actuator is following:

The ionomeric membrane will be swollen in solvent with high increase of volume, for example MeOH. This is the initial stage.

At the next stage the solvent will be substituted be the one with lower volume increase value, for example $H_2O$. The actuator will shrink and perform linear actuation.

The procedure can be used repeatedly. The possible use of such kind of actuator is chemical sensor, environmentally sensitive actuators, etc.

The exemplary embodiments presented herein illustrate the principles of the invention and are not intended to be exhaustive or to limit the invention to the form disclosed; it is intended that the scope of the invention be defined by the claims appended hereto and their equivalents.

What is claimed is:

1. A shape changing manipulator comprising:
  a plurality of elements, wherein each of said plurality of elements comprises a bending ionic electroactive polymer material with a conducting surface layer, each of said plurality of elements mechanically connected with at least one another element of said plurality of elements and being electrically connectable to a power source for controllably powering each of said plurality of elements for changing its shape, wherein at least one of said plurality of elements is adapted to operate as a touch and force sensor,
  wherein said plurality of elements are combined together to form a rim, wherein each element of said plurality of elements comprises a first section, said first sections are mechanically connected with each other, and each element of said plurality of elements comprises a second section with electrodes for receiving an activating voltage from the power source, wherein each of said second section being capable of moving toward to and away from a center of said rim, thereby changing a shape of said rim when voltage is applied to said electrodes of said plurality of elements individually or in groups according to predetermined algorithm, causing said manipulator to move in a desired manner.

2. The manipulator as in claim 1, comprising a control circuit, wherein said control circuit and the power source are housed within said manipulator.

3. The manipulator as in claim 1, comprising a plurality of spokes, wherein a first end of each spoke is connected with each other in a center region of said manipulator and a second end of each spoke is extending in different radial direction from said center region, and said second end of each spoke is connected to one of said plurality of elements.

4. The manipulator as in claim 1, wherein manipulator has a supporting surface and said first section of each element is fixed to and supported by said surface, and said second section is capable of moving towards to, and away from said supporting surface.

5. A shape changing manipulator comprising:
a plurality of elements, wherein each of said plurality of elements comprises a bending electroactive polymer material with a conducting surface layer, each of said plurality of elements mechanically connected with at least one another element of said plurality of elements and being electrically connectable to a power source for controllably powering each of said plurality of elements for changing its shape, wherein at least one of said plurality of elements is adapted to operate as a touch and force sensor,
wherein said plurality of elements are combined together to form a ball-like elliptical surface, each element having a first section, said first sections mechanically connected with each other, and each element having a second section with electrodes for receiving an activating voltage from the power source, and each of said second section being capable of moving toward to and away from the center of said manipulator, thereby causing said manipulator to move in a desired manner when voltage is applied to said elements individually or in groups according to predetermined algorithm.

6. The manipulator as in claim 5, comprising a control circuit, wherein said control circuit and the power source are housed inside said elliptical surface.

7. The manipulator as in claim 5, comprising a plurality of spokes wherein a first end of each spoke is mechanically connected to each other in a center region of said manipulator and a second end of each spoke is extending in different radial direction from said center region and said second end of each spoke is mechanically connected to one of said plurality of elements.

8. The manipulator as in claim 7, wherein manipulator has a supporting surface and said first section of each element is fixed to and supported by said surface, and said second section is capable of moving towards to, and away from said supporting surface.

9. The manipulator as in claim 8 comprising a surface, made of an elastic material, wherein each of said plurality of elements comprising a first end connected to each other in a center region of the manipulator and a second end extending in a different radial direction from said center region against said surface, each element having electrodes for receiving a voltage from the power source, wherein the shape of the manipulator can be changed by applying a voltage to at least one of said elements, causing said element to bend or to change its linear dimensions.

* * * * *